United States Patent
Liu et al.

(10) Patent No.: US 10,033,503 B2
(45) Date of Patent: Jul. 24, 2018

(54) METHODS AND DEVICES FOR DYNAMIC ALLOCATION OF IDENTIFIERS IN HYBRID CELL IDENTIFIER SCENARIOS

(75) Inventors: Jing Xiu Liu, Beijing (CN); De Shan Miao, Beijing (CN); Peter Skov, Beijing (CN); Xiao Yi Wang, Wheeling, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 129 days.

(21) Appl. No.: 14/115,380

(22) PCT Filed: May 3, 2011

(86) PCT No.: PCT/CN2011/073604
§ 371 (c)(1),
(2), (4) Date: Nov. 4, 2013

(87) PCT Pub. No.: WO2012/149674
PCT Pub. Date: Nov. 8, 2012

(65) Prior Publication Data
US 2014/0079009 A1 Mar. 20, 2014

(51) Int. Cl.
*H04L 5/00* (2006.01)
*H04W 8/26* (2009.01)
*H04W 48/08* (2009.01)

(52) U.S. Cl.
CPC ............ *H04L 5/0051* (2013.01); *H04W 8/26* (2013.01); *H04W 48/08* (2013.01)

(58) Field of Classification Search
None
See application file for complete search history.

(56) References Cited

U.S. PATENT DOCUMENTS

2010/0177746 A1* 7/2010 Gorokhov .............. H04B 7/024
370/336
2010/0273514 A1* 10/2010 Koo ....................... H04B 7/024
455/501

(Continued)

FOREIGN PATENT DOCUMENTS

CN 101931485 A 12/2010
CN 102026298 A 4/2011

(Continued)

OTHER PUBLICATIONS

R1-110591; Research in Motion, UK Limited; "Some Design Consideration for CoMP Scenario 4"; 3GPP TSG RAN WG1 Meeting #64; Taipei, Taiwan, Feb. 21-25, 2011.

(Continued)

*Primary Examiner* — Yemane Mesfin
*Assistant Examiner* — Jeff Banthrongsack
(74) *Attorney, Agent, or Firm* — Harrington & Smith

(57) ABSTRACT

The present invention proposes a method, including in a communication network area constituted by a plurality of transmission points configured for coordinated transmissions to at least one target, each transmission point being identified by an individual identifier, each transmission point being configured to transmit common reference signals on common channels and dedicated reference signals on dedicated channels to said at least one target device, assigning the respective individual identifier of each transmission point to the common reference signals on the common channels of the respective transmission point, and allocating, to the dedicated reference signals on the dedicated channels of respective plural transmission points, an identifier unrelated to the individual identifiers. Also, corresponding devices are addressed.

19 Claims, 4 Drawing Sheets

(56) References Cited

U.S. PATENT DOCUMENTS

| | | | | |
|---|---|---|---|---|
| 2011/0038310 A1* | 2/2011 | Chmiel | ............... | H04L 27/2613 |
| | | | | 370/328 |
| 2011/0170435 A1* | 7/2011 | Kim | ..................... | H04L 5/0023 |
| | | | | 370/252 |
| 2012/0281556 A1* | 11/2012 | Sayana | .................. | H04B 7/024 |
| | | | | 370/252 |

FOREIGN PATENT DOCUMENTS

| | | | | |
|---|---|---|---|---|
| EP | 2343942 A1 * | 7/2011 | ............. | H04B 7/024 |
| KR | 2010/0126552 A | 12/2010 | | |
| WO | WO 2010/032791 A1 | 3/2010 | | |
| WO | WO 2011/031079 A2 | 3/2011 | | |

OTHER PUBLICATIONS

R1-110649; Ericsson; "Aspects on Distributed RRUs with Shared Cell-ID for Heterogeneous Deployments"; 3GPP TSG-RAN WG1 #64; Taipei, Taiwan, Feb. 21-Feb. 25, 2011.

R1-111029; Nokia Siemens Networks, Nokia; "Further details on CoMP scenarios"; 3GPP TSG-RAN WG1 Meeting #64; Taipei, Taiwan, Feb. 21-25, 2011.

\* cited by examiner

METHODS AND DEVICES FOR DYNAMIC ALLOCATION OF IDENTIFIERS IN HYBRID CELL IDENTIFIER SCENARIOS

FIELD OF THE INVENTION

The present invention relates to methods and devices for dynamic allocation of identifiers in hybrid cell identifier scenarios. More particularly, the present invention relates to such methods and devices which, based thereon, enable dynamic demodulation reference signal, DM-RS, sequence configuration in hybrid cell ID scenarios for next generation networks.

BACKGROUND

This invention relates to mobile communication and as an example refers to the currently discussed and developed Long-Term Evolution standard (LTE) which features, among others, coordinated transmissions from multiple points also known as Coordinated Multipoint Transmission CoMP.

While previously CoMP required coordination between cells using the same carrier, in most recent CoMP scenarios, the transmission points to be coordinated can be of different locations or different antennas (e.g. in MIMO arrangements (Multiple Input Multiple Output). Likewise, such scenarios may involve that the locations are assigned the same cell ID or resort to resource using different component carriers CC (like e.g. in carrier aggregation). CoMP as used in the present invention is thus to be understood in its broadest sense and not limited to pre-existing ComP scenarios.

Preceding standardization discussions selected the HetNet (heterogenous network) scenario as one of the basic scenario for CoMP evaluation. In this scenario, several Pico cells (constituted by pico eNB (evolved Node_B) or, simply, remote radio heads RRH) locate in the coverage of a macro eNB. Pico and macro, respectively, denote the coverage area defined by such a transmission point or access point, and the coverage area is linked to the transmit power assigned to such nodes which is also reflected in the naming adopted, i.e. pico cells have smaller coverage while macro cells have larger coverage.

The cooperation or coordinated transmission from multiple such points, i.e. CoMP, could either happen between Macro eNB and one or more Pico eNBs in corresponding coverage, or between Macro eNB/Pico(s) of different sectors/cells. (Note that pico eNB sometimes is simply referred to as remote radio head RRH.)

For explanatory purposes, FIG. 1 illustrates roughly a heterogeneous network with low power (small coverage) RRHs within the macrocell coverage. In this exemplary scenario, transmission/reception points created by the RRHs have different cell IDs as the macro cell. The coordination area includes 1 cell with N low-power nodes as starting point, i.e. as illustrated 3 intra-site cells with 3=N low-power nodes. The macro eNB is assigned cell ID 1, and the RRH are assigned their respective individual ID, i.e ID 2, ID 3, and ID 4. The benchmark for the expected performance is non-CoMP Rel. 10 eICIC framework (enhanced intercell interference coordination with the different cell ID.

Likewise, for explanatory purposes, FIG. 2 illustrates roughly a network with low power RRHs within the macrocell coverage, where the transmission/reception points created by the RRHs have the same cell IDs as the macro cell. Here, the coordination area includes 1 cell with N low-power nodes as starting point, and thus 3 intra-site cells with 3=N low-power nodes. Also here, the performance benchmark is non-CoMP Rel. 10 eICIC framework with the different cell ID.

The major difference of these scenarios shown in FIG. 1 and FIG. 2 is whether different transmission points have the same cell-ID or different cell-ID.

The basic deployment scenario is one macro eNB+multiple RRH with fiber connected. (The fiber connections are illustrated in FIG. 2 between macro and pica points as arrows, but are omitted from illustration in FIG. 1). There are two basic methods to assign cell-ID for all the transmission points (1 macro+N RRH in one cell area).

In FIG. 1, transmission points are of different cell ID: Different sync, broadcast and UE-specific control channels are thus transmitted from each point, each RRH is an individual cell seen from UE.

One advantage of having different cell ID's for different physical cells (or physical transmission points) is a maximized PDCCH multiplexing capability (physical downlink control channel). Without cell-specific scrambling sequence and the interleave feature of the PDCCH, different cells (different transmission points) can multiplex the same resource for different PDCCH transmission.

However, the most challenging issue of different cell ID for Rel. 10 and later releases, is DMRS (demodulation reference signal) orthogonality issue. If a different cell ID is used, the DMRS used for PDSCH (physical downlink shared channel) is always quasi-orthogonal between each other. That is not an optimized case comparing with same-cell ID approach. E.g. In same cell ID case, a scheduler can assign the same physical resources to multiple UE and each with a mutually full-orthogonal DMRS sequence. In other words, the different DMRS sequence based on the same-cell ID can provide spatial orthogonality between different UEs.

That's also the reason at Rel.8, it's per UE DMRS, and in Rel.9, it's per cell DMRS with dynamical indicated scrambling ID.

A second option is shown in FIG. 2 as proposed in a recent 3GPP RAN1 meeting. All the transmission points (macro and RRH) within the coverage area of a macro point share the same cell-id, (one cell). It is important to realize that adding pico points to an existing macro deployment does not increase the area covered by a cell.

The major advantage of this same cell-ID concept is to extremely enlarge the degree of freedom for data channel cooperation transmission, either from CSI-RS (channel state indicator reference signal) or DM-RS (demodulation reference signal) perspective. Because the same cell-id provide the same base sequence for CSI-RS and DM-RS, and different port of CSI-RS/DM-RS provide perfect orthogonality.

But the disadvantage is also obvious, namely that all the UEs in the coverage of Macro eNB including those in the Pico coverage should share the same PDCCH resources, which will extremely limit the degree of freedom and also limit the potential gain of cooperation transmission.

Either options (same cell-ID or different cell-ID) has its own pros and cons, so it's really hard to make final selection because it's hard to evaluate which is more influential for the compromise that has to be made.

The fundamental reason for above situation is that no matter same cell-ID or different cell-ID solution, PDCCH/PSS (primary synchronization signal)/SSS (secondary synchronization signal)/BCH (broadcast Channel)/PCFICH (Physical control format indicator channel)/PHICH (physical hybrid ARQ indicator channel) and CSI-RS/DM-RS/PDSCH from the same transmission points are always connected to the same cell-ID. So if control channels (PD-CCH, PHICH, and all CRS (common reference signal) based channels) are deployed with same cell ID, then all the CSI-RS and DMRS will be of same cell ID as well. That makes control channels are limited by multiplexing capacity since all the sequences for control channels are based on the same sequence. If control channels (PDCCH, PHICH, and all CRS based channels) are deployed with different cell ID, then all the CSI-RS and DMRS will be of different cell ID as well. That makes the DMRS/PDSCH from different transmission impossible to be orthogonal to each others, which will limit the potential gain of cooperation transmission again.

Some companies have proposed using some cell specific CoMP ID to address DL (downlink) DMRS sequence ID indication. That is to say, instead R10 cell ID, using (an additionally provided) CoMP ID to generate the sequence ID for the UE in the CoMP transmission.

DMRS_ID=f(CELL_ID+Scramble_ID)            R10 UE

DMRS_ID=f(CoMP_ID+Scramble_ID)            CoMP UE

This method has addressed the problem above but partially. Namely, according to this method, DMRS sequence ID can still not be changed dynamically, (and the scrambling ID is quite limited). Considering a large complex CoMP coordination area, flexibility on cell ID used is quite needed to achieve best performance.

Therefore, it is an object of the present invention to propose improvements in scenarios as outlined above.

SUMMARY OF THE INVENTION

This invention is providing methods and devices to solve the above object.

According to an aspect, the above object is for example accomplished by a method, comprising, in a communication network area constituted by a plurality of transmission points configured for coordinated transmissions to at least one target, each transmission point being identified by an individual identifier, each transmission point being configured to transmit common reference signals on common channels and dedicated reference signals on dedicated channels to said at least one target device, assigning the respective individual identifier of each transmission point to the common reference signals on the common channels of the respective transmission point, and allocating, to the dedicated reference signals on the dedicated channels of respective plural transmission points, an identifier unrelated to the individual identifiers.

According to further developments of such aspect said assigning comprises assigning the physical identifier of a respective transmission point as the individual identifier;

said allocating comprises allocating a high-layer identifier associated to the network area constituted by the plurality of transmission points configured for coordinated transmissions as a common identifier;

said allocating comprises maintaining a predefined indexed list of useable identifiers, and selecting, at respective transmission points, an indexed identifier from the indexed list based on an indicated index;

said allocating comprises predefining an identifier shift parameter, and shifting the identifier of a respective transmission point by the value indicated by the at least one common shift parameter;

said allocating comprises grouping individual identifiers of respective transmission points to a group cell identifier, and changing, at a respective transmission point, the group cell identifier based on a scrambling identifier by the scrambling value thereof;

it further comprises transmitting the information for allocating the identifier allocated to the dedicated reference signals, from a predetermined transmission point to other transmission points constituting a network area and to the targets, and generating, at the targets, an identifier of a demodulation reference signal based on the indicated information.

According to an aspect, the above object is for example accomplished by a method, comprising, in a transmission point of a communication network area constituted by a plurality of transmission points configured for coordinated transmissions to at least one target, each transmission point being identified by an individual identifier, each transmission point being configured to transmit common reference signals on common channels and dedicated reference signals on dedicated channels to said at least one target device, assigning the individual identifier of the transmission point to the common reference signals on the common channels of the transmission point, and allocating, to the dedicated reference signals on the dedicated channels of the transmission point, an identifier unrelated to the individual identifiers.

According to further developments of such aspect said assigning comprises assigning the physical identifier of the transmission point as the individual identifier;

said allocating comprises allocating a high-layer identifier associated to the network area constituted by the plurality of transmission points configured for coordinated transmissions as a common identifier.

said allocating comprises maintaining a predefined indexed list of useable identifiers, and selecting, at the transmission point, an indexed identifier from the indexed list based on an indicated index received from a network entity;

said allocating comprises predefining an identifier shift parameter, and shifting the identifier of the transmission point by the value indicated by the at least one common shift parameter;

said allocating comprises grouping individual identifiers of respective transmission points to a group cell identifier, and changing, at the transmission point, the group cell identifier based on a scrambling identifier by the scrambling value thereof;

it further comprises transmitting the information for allocating the identifier allocated to the dedicated reference signals, from the transmission point to other transmission points constituting a network area and to the targets;

said allocating comprises maintaining a predefined indexed list of useable identifiers, and selecting, at the transmission point, an indexed identifier from the indexed list based on an indicated index received from an other transmission point;

said allocating comprises predefining an identifier shift parameter, and shifting the identifier of another transmission point by the value indicated by the at least one common shift parameter;

it further comprises transmitting the information for allocating the identifier allocated to the dedicated reference signals, from the transmission point to the targets.

According to an aspect, the above object is for example accomplished by a method, comprising, at a target in a communication network area constituted by a plurality of transmission points configured for coordinated transmissions to the target, each transmission point being identified by an individual identifier, each transmission point being configured to transmit common reference signals on common channels and dedicated reference signals on dedicated channels to said at least one target device, receiving information suitable for allocating, to the dedicated reference signals on the dedicated channels of respective plural transmission points, an identifier unrelated to the individual identifiers.

According to further developments of such aspect said receiving comprises receiving and allocating a high-layer identifier associated to the network area constituted by the plurality of transmission points configured for coordinated transmissions as a common identifier;

said receiving comprises maintaining a predefined indexed list of useable identifiers, and selecting, at the target, an indexed identifier from the indexed list based on a received indicated index;

said receiving comprises shifting the identifier of a transmission point by the value indicated by the at least one received common shift parameter;

said receiving comprises changing the group cell identifier based on a scrambling identifier by the scrambling value thereof received at the target;

it further comprises generating an identifier of a demodulation reference signal based on the indicated information, and using an identified sequence of the associated demodulation reference signal for communication with the transmission points.

According to an aspect, the above object is for example accomplished by a system, comprising, in a communication network area constituted by a plurality of transmission points configured for coordinated transmissions to at least one target, each transmission point being identified by an individual identifier, each transmission point being configured to transmit common reference signals on common channels and dedicated reference signals on dedicated channels to said at least one target device, means configured to assign the respective individual identifier of each transmission point to the common reference signals on the common channels of the respective transmission point, and means configured to allocate, to the dedicated reference signals on the dedicated channels of respective plural transmission points, an identifier unrelated to the individual identifiers.

According to further developments of such aspect said means configured to assign is configured to assign the physical identifier of a respective transmission point as the individual identifier;

said means configured to allocate is configured to allocate a high-layer identifier associated to the network area constituted by the plurality of transmission points configured for coordinated transmissions as a common identifier;

said means configured to allocate is configured to maintain a predefined indexed list of useable identifiers, and select, at respective transmission points, an indexed identifier from the indexed list based on an indicated index;

said means configured to allocate is configured to predefine an identifier shift parameter, and shift the identifier of a respective transmission point by the value indicated by the at least one common shift parameter;

said means configured to allocate is configured to group individual identifiers of respective transmission points to a group cell identifier, and change, at a respective transmission point, the group cell identifier based on a scrambling identifier by the scrambling value thereof;

it further comprises a transmitter configured to transmit the information for allocating the identifier allocated to the dedicated reference signals, from a predetermined transmission point to other transmission points constituting a network area and to the targets, and generate, at the targets, an identifier of a demodulation reference signal based on the indicated information.

According to an aspect, the above object is for example accomplished by a device, comprising, at a transmission point of a communication network area constituted by a plurality of transmission points configured for coordinated transmissions to at least one target, each transmission point being identified by an individual identifier, each transmission point being configured to transmit common reference signals on common channels and dedicated reference signals on dedicated channels to said at least one target device, means configured to assign the individual identifier of the transmission point to the common reference signals on the common channels of the transmission point, and allocate, to the dedicated reference signals on the dedicated channels of the transmission point, an identifier unrelated to the individual identifiers.

According to further developments of such aspect said means configured to assign is configured to assign the physical identifier of the transmission point as the individual identifier;

said means configured to allocate is configured to allocate a high-layer identifier associated to the network area constituted by the plurality of transmission points configured for coordinated transmissions as a common identifier;

said means configured to allocate is configured to maintain a predefined indexed list of useable identifiers, and select, at the transmission point, an indexed identifier from the indexed list based on an indicated index received from a network entity;

said means configured to allocate is configured to predefine an identifier shift parameter, and shift the identifier of the transmission point by the value indicated by the at least one common shift parameter;

said means configured to allocate is configured to group individual identifiers of respective transmission points to a group cell identifier, and change, at the transmission point, the group cell identifier based on a scrambling identifier by the scrambling value thereof;

it further comprises a transmitter configured to transmit the information for allocating the identifier allocated to the dedicated reference signals, from the transmission point to other transmission points constituting a network area and to the targets;

said means configured to allocate is configured to maintain a predefined indexed list of useable identifiers, and select, at the transmission point, an indexed identifier from the indexed list based on an indicated index received from an other transmission point;

said means configured to allocate is configured to predefine an identifier shift parameter, and shift the identifier of another transmission point by the value indicated by the at least one common shift parameter;

it further comprises a transmitter configured to transmit the information for allocating the identifier allocated to the dedicated reference signals, from the transmission point to the targets.

According to an aspect, the above object is for example accomplished by a device, comprising, at a target in a communication network area constituted by a plurality of transmission points configured for coordinated transmissions to the target, each transmission point being identified by an individual identifier, each transmission point being configured to transmit common reference signals on common channels and dedicated reference signals on dedicated channels to said at least one target device, means configured to receive information suitable for allocating, to the dedicated reference signals on the dedicated channels of respective plural transmission points, an identifier unrelated to the individual identifiers.

According to further developments of such aspect
said means configured to receive is configured to receive and allocate a high-layer identifier associated to the network area constituted by the plurality of transmission points configured for coordinated transmissions as a common identifier;
said means configured to receive is configured to maintain a predefined indexed list of useable identifiers, and select, at the target, an indexed identifier from the indexed list based on a received indicated index;
said means configured to receive is configured to shift the identifier of a transmission point by the value indicated by the at least one received common shift parameter;
said means configured to receive is configured to change the group cell identifier based on a scrambling identifier by the scrambling value thereof received at the target;
it further comprises a generator configured to generate an identifier of a demodulation reference signal based on the indicated information, and use an identified sequence of the associated demodulation reference signal for communication with the transmission points.

Accordingly, by virtue of the above aspects proposed by the present invention, at least according to one or more exemplary embodiments and/or features of the invention, the following advantageous effects are realized:

The channel state information reference signal/demodulation reference signal CSI-RS/DM-RS identifiers and also sequences in the same cooperation area are fully orthogonal to each other. There is flexibility on cell ID configuration of physical downlink shared channel PDSCH and demodulation reference signal DMRS. A need for CSI-RS muting does not exceed a similar need as also present in other scenarios.

Comparing the presented method according to at least exemplary embodiments of the invention with the scenario shown in FIG. 2 (same cell-ID solution), the present invention provides for maximized control channel capacity, i.e. physical downlink control channel PDCCH etc.

Other potential advantages of this invention are, at least in one or more exemplary embodiments: It can be extended to decouple the relationship between a physical cell identifier PCI and uplink demodulation reference signal DM-RS of physical uplink control channel PUCCH, so as to provide higher degree of freedom for uplink control channel cooperation.

BRIEF DESCRIPTION OF THE DRAWINGS

The present invention will be more readily understood when referring to the accompanying drawings, in which.

DETAILED DESCRIPTION

Figure 1:
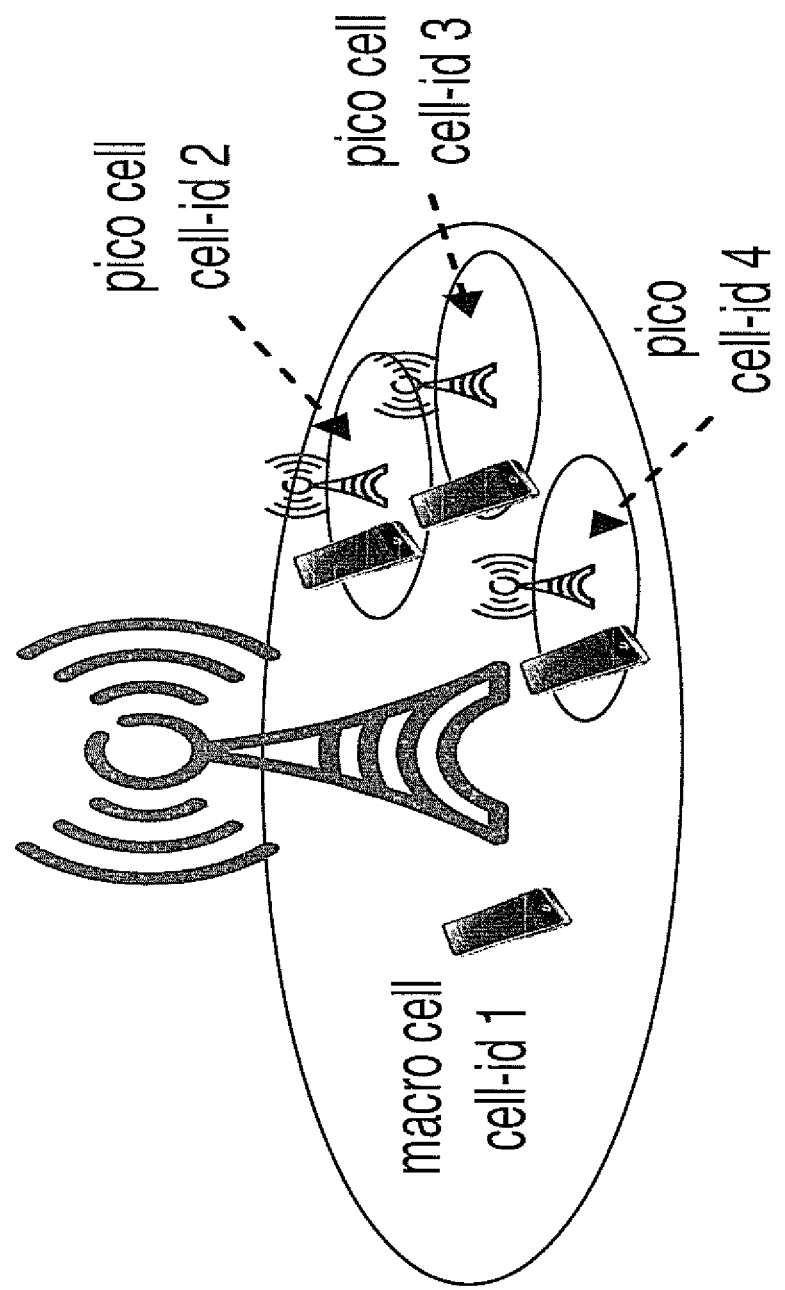
FIG. 1 shows a partial overview of a network with entities involved in some background scenario related to CoMP.
Figure 2:
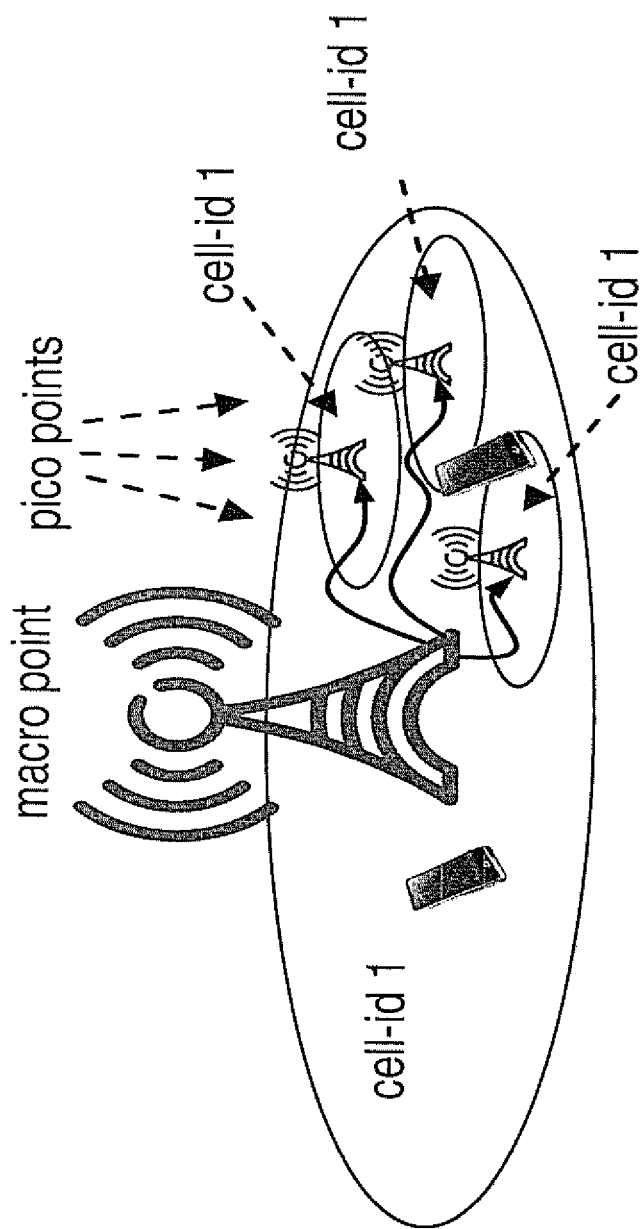
FIG. 2 shows a partial overview of a network with entities involved in some other background scenario related to CoMP.

Prior to describing the individual drawings, the subsequent section will outline an overall description of at least exemplary aspects of the present invention. It is believed to be proper to obtain a general understanding of the functionalities conceived under the present invention.

According to one or more exemplary embodiments of the present invention, it is provided for de-coupling the cell ID used for CRS related channels (cell specific reference signal and/or common reference signals) and CSI-RS/DM-RS related channels (channel state indicator reference signal/demodulation reference signal). The CSI-RS/DM-RS reference signals, as they are not common channels, are also referred to as dedicated channels.

Thus, according to this aspect of the invention, a method is proposed in a communication network area constituted by a plurality of transmission points configured for coordinated transmissions to at least one target, each transmission point being identified by an individual identifier, each transmission point being configured to transmit common reference signals on common channels and dedicated reference signals on dedicated channels to said at least one target device, which comprises, assigning the respective individual identifier of each transmission point to the common reference signals on the common channels of the respective transmission point, and allocating, to the dedicated reference signals on the dedicated channels of respective plural transmission points, an identifier unrelated to the individual identifiers.

That is to say, another high layer configured "Transmission cell ID" (different from physical cell identifier PCI) is granted for each UE to be used for CSI-RS and DMRS generation and also PDSCH transmission (PCI is still associated with PSS/SSS/CRSBCH/PCFICH/PHICH/PDCCH as the common channels).

Stated in other words, communication between the transmission points in the cooperation area and the targets, i.e. UEs (user equipments), takes place using different identifiers for common channels and dedicated channels, respectively. The differing identifiers are known to the transmission points as well as to the UEs who are aware/informed about the allocating of such high-layer identifier associated to the network area constituted by the plurality of transmission points configured for coordinated transmissions as a common identifier for the dedicated channels. Generally, activities on eNB side reside in transmitting PDCCH to UE assuming its individual identifier, e.g. PCI. When UE received that PDCCH, according to the DCI signaling inside, UE shall use an unrelated, i.e. another predefined or dynamic signaled, cell ID to generate DMRS and PUSCH.

And the signaling could be UE-specific or even cell-specific. In cellular system, the radio air signals are marked by a fundamental physical identifier: PCI (physical cell ID), which distinguishes signals from different cells. On top of that, a UE specific identifier can be added, if added, different UE within the same cell has dedicated channels (user-specific identifier), if not added, then all UE share the same channel (cell-specific identifier for this channel).

Transmission points may be grouped to a transmission group cell, and share the same cell-specific identifier for the dedicated channels, thus (group) cell specific. I.e. in a cooperation area comprising 1 macro eNB and 3 pico RRH, e.g. 2 groups of cells of 2 transmission points each could be configured which share a respective identifier for the dedicated channels.

One simple implementation example is:

For common channels, e.g. PDCCH/CRS/PSS/SSS/BCH/PCFICH/PHICH, different transmission points (Macro eNB or Pico or RRH) have different cell-id such as their physical cell identifier PCI; while for dedicated channels such as CSI-RS/DM-RS, different transmission points have the same cell id which is distinct from and unrelated to the PCI's.

If such distinct cell ID is fixed, a static scenario is present, while if the distinct cell ID is variable, a dynamic scenario is present.

In order to enable dynamic configuration, 3 alternatives of exemplary embodiments are outlined as follows:

Exemplary Embodiment 1(Alternative 1)
a) A network entity predefines multiple cell IDs to be used through RRC signaling (UE specific or UE group specific)
b) eNB indicates the index of cell ID with explicit information bit in the downlink control information, DCI (PDCCH);
RRHs and the macro are all controlled by the one eNB. So RRH will be informed about the cell-IDs used for related UE.
c) UE follows the indicated cell ID from DCI to generate the DMRS sequence ID as follows:

DMRS_ID=$f$(CELL($n$)_ID+Scramble_ID)

Where CELL(n)_ID is the RRC pre-configured cell ID list known to the UE and the RRHs/eNB, and n is the explicit signaling from DCI on the index. And scramble_ID is also indicated through DCI.

Thus, according to this exemplary embodiment, allocating comprises maintaining a predefined indexed list of useable identifiers, and selecting, at respective transmission points (and targets, i.e. terminals UE), an indexed identifier from the indexed list based on an indicated index.

Exemplary Embodiment 2(Alternative 2)
a) A network entity predefines a cell ID shift parameter, which is known by eNB (& RRHs) and UE
b) eNB indicates shift parameter with explicit information bit in the DCI RRHs and the macro are all controlled by the one eNB. So RRH will be informed about the cell-IDs used for related UE. c) UE gets the shift parameter and combines own cell ID to generate the DMRS sequence ID.

Own cell ID is PCI, it's the cell ID that this UE is camping on. And UE learns PCI from Sync channel. This shifting method is not just for scenario 4, for other scenarios the shift value can make the DMRS_ID the same across multiple cells anyway. Since shift value is a RRC configured parameter, which can be different for different UE. E.g. UE in PCI=35, can be given a shift value 65 by RRC signaling, and UE in PCI=47, can be given a shift value of 53. Then in the end, the DMRS_ID could be the same for this two UEs.

DMRS_ID=$f$(CELL_ID+shift_value+Scramble_ID)

Where Scramble_ID is 0 or 1 as now in LTE Rel.10

Thus, in this exemplary embodiment, allocating comprises predefining an identifier shift parameter, and shifting the identifier of a respective transmission point by the value indicated by the at least one common shift parameter.

Exemplary Embodiment 3(Alternative 3)
Group the Cell-ID, e.g. put altogether N cells to one group with group ID. Enable the number scramble_ID to be one out of N values, thus in the range of Scramble_ID is 0 . . . N−1. (Current Scramble_ID only have two values: 0 or 1).

DMRS_ID=$f$(CELL_ID%$N$+Scramble_ID)

Then through proper scramble ID adjustment (for which quite many algorithms can be applied, but basically it resides in putting cell-edge UE to use the grouped DMRS_ID and then to perform CoMP), eNB can command UE to use any DMRS sequence ID.

Thus, in this exemplary embodiment, said allocating comprises grouping individual identifiers of respective transmission points to a group cell identifier, and changing, at a respective transmission point, the group cell identifier based on a scrambling identifier by the scrambling value thereof.

In each of the above exemplary embodiments the information for allocating the identifier allocated to the dedicated reference signals are transmitted from a predetermined transmission point to other transmission points constituting a network area and to the targets, and at the targets, an identifier of a demodulation reference signal is generated based on the indicated information.

Thus, as described above, throughout the various embodiments, a break is introduced between the connection between common references signal or cell specific reference signal, CRS, related channels and dedicated channels such as CSI-RS/DM-RS related ones, using different cell-ID, and the CSI-RS/DM-RS from the different transmission points in the same cooperation area will share the same cell-ID or CoMP-ID. This provides extremely high flexibility for data transmission. CRS-based channel from different transmission points are based on different cell-ID, so that the PDCCH capacity is maximized for legacy terminals (Rel. 8-10 terminals).

Comparison of the invention and its methods with the scenario shown in FIG. 1 (different cell-ID solution) is described below.

Figure 3:
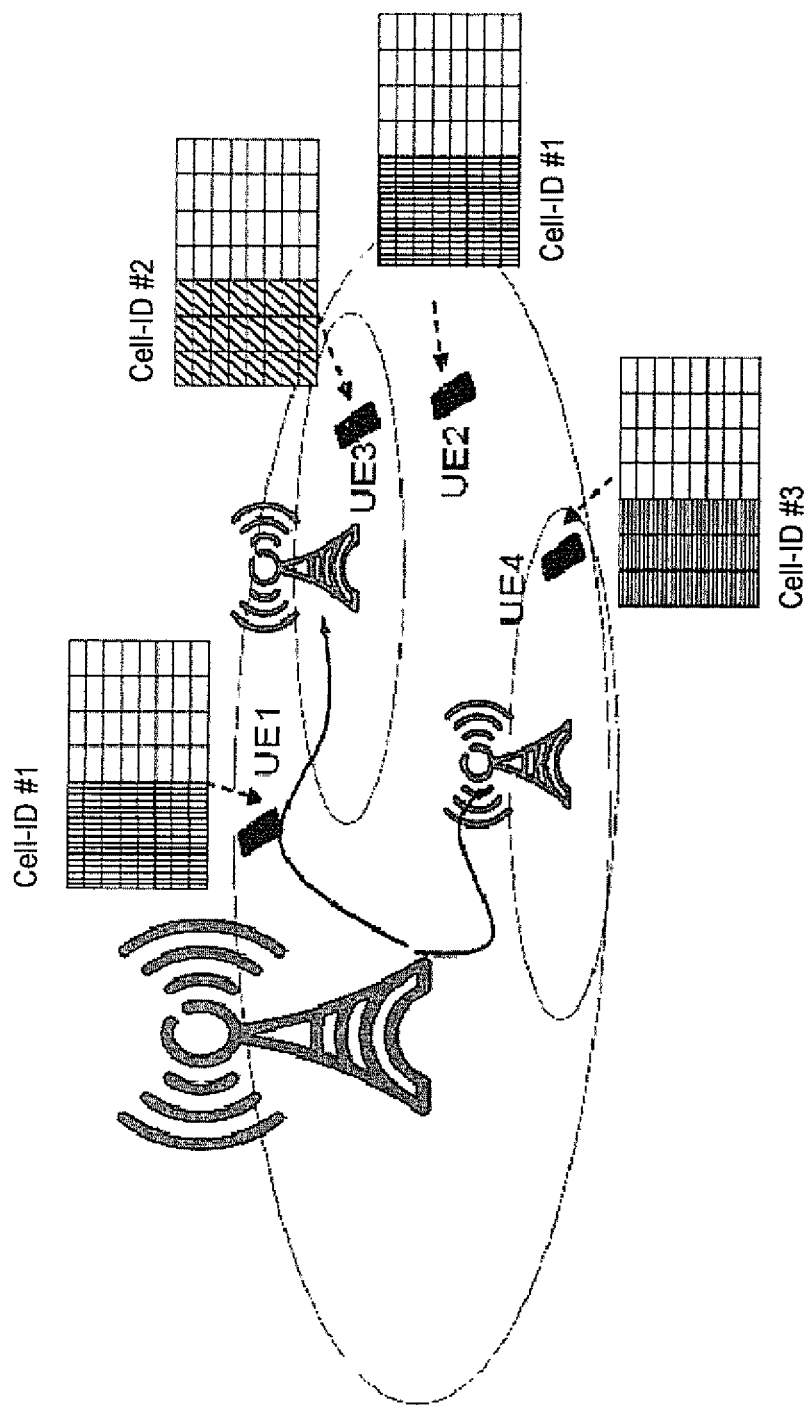
FIG. 3 shows a partial overview of network entities involved in at least a partial individual aspect of an exemplary scenario related to the present invention.
Figure 4:
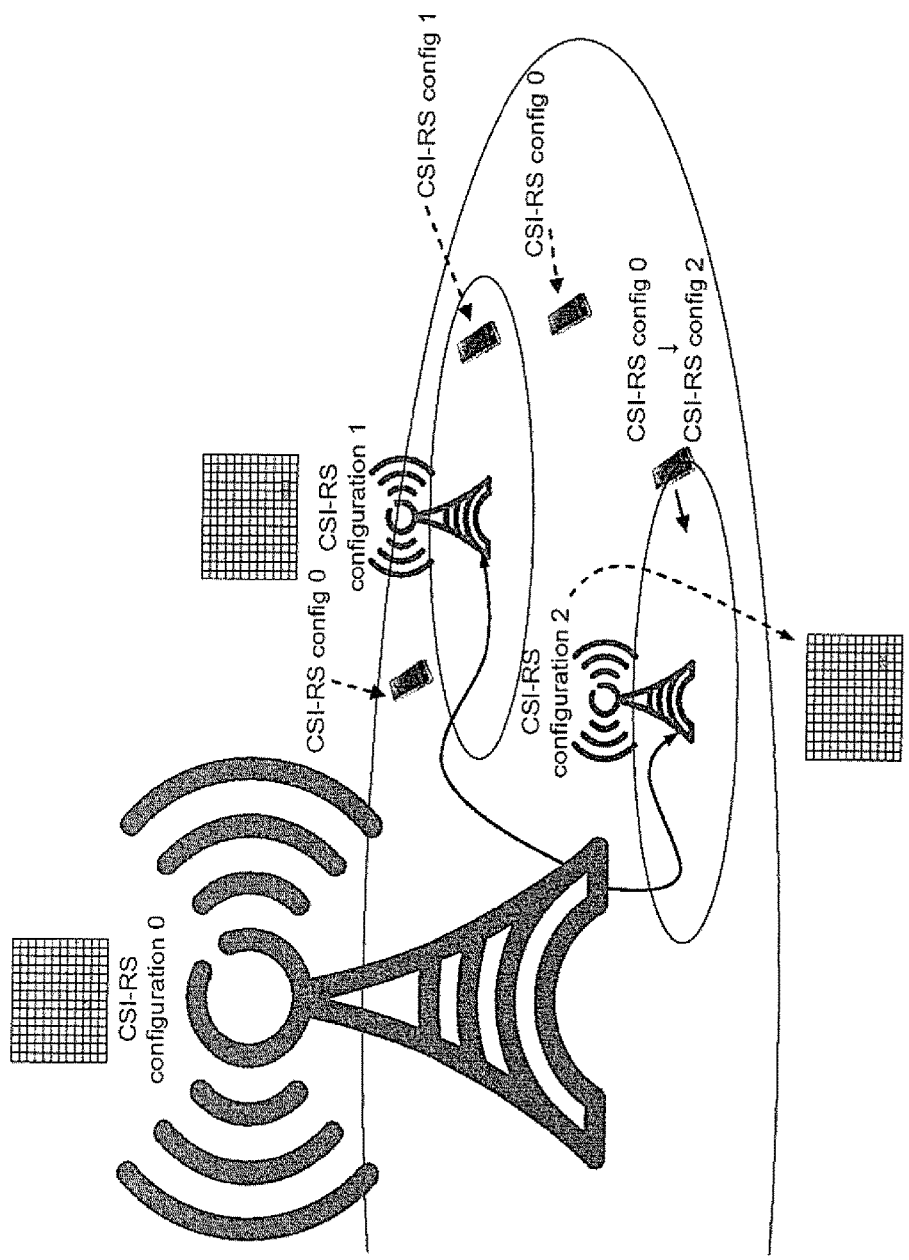
FIG. 4 shows a partial overview of network entities involved in at least another partial individual aspect of an exemplary scenario related to the present invention.

FIGS. 3 and 4 show a partial overview of a network with entities involved in some interaction with each other. FIG. 3 illustrates merely the common reference signal channel aspect of the implementation while FIG. 4 shows the dedicated reference signal channel aspect.

Common to both Figures, the matrices in FIG. 3/4, represent resource elements. The respective horizontal axis is time domain with the unit is OFDM symbol, i.e. one grid represents an OFDM symbol in time domain; the respective vertical axis is frequency domain and the unit is PRB or subband, i.e. one grid represents a physical resource block or subband (although the exact number when implemented should follow the 3GPP specifications, in the illustrated exemplary embodiments, the number of squares in the figures is just for example). The highlighted regions in the left part of the matrices denotes those REs used and/or assigned for PDCCH transmission, and different highlighting is used to denote its meaning of quasi-orthogonal resource of PDCCH among different cell based on different cell-ID.

In FIG. 3, for all CRS related channels, different transmission points have different cell ID, i.e. cell-ID #1 for Macro eNB and cell-ID #2 and cell-ID #3 for two Picos present within the coverage of the macro. Then UE1 and UE2 in the coverage of Macro eNB will share the same PDCCH resources based on cell-ID #1, but UE3 and UE4 will utilize the another PDCCH resource based on different cell IDs, i.e. cell ID #2 for UE3 and cell-ID 3 for UE4. So the PDCCH capacity in the whole region is maximized considering different transmission points have different base sequence for control channel. (Optionally, Rel.10 eICIC scheme could be utilized to mitigate the interference.)

In FIG. 4, for all the CSI-RS/DM-RS related dedicated channels from different transmission points, those are based on the same cell-ID, for example, CoMP-ID or cooperation area CA-ID.

Also, there are enough number of CSI-RS ports in the whole region, for example in 1 macro+4 RRH, each with 4 transmitters Tx, then all-together this cell is provided with 20 CSI-RS ports (corresponding to 20 resource elements RE/physical resource blocks PRB). Also Multiple CSI-RS patterns are supported, and each of them contains several number of CSI-RS port (<8 to be consistence with R10). Normally one CSI-RS pattern is associated with one transmission point. Each UE is granted with one CSI-RS pattern. And using muting to prevent severe mutual interference is also possible, while using UE specific CSI-RS configuration.

Note that modifications described with regard to an exemplary embodiment can also be valid/possible for another exemplary embodiment, and in particular, individual modifications in a respective exemplary embodiment may also be combined in another exemplary embodiment. It is thus understood, that further modifications could be made without changing the inventive concept of the present invention.

The present invention proposes a method, comprising: in a communication network area constituted by a plurality of transmission points configured for coordinated transmissions to at least one target, each transmission point being identified by an individual identifier, each transmission point being configured to transmit common reference signals on common channels and dedicated reference signals on dedicated channels to said at least one target device, assigning the respective individual identifier of each transmission point to the common reference signals on the common channels of the respective transmission point, and allocating, to the dedicated reference signals on the dedicated channels of respective plural transmission points, an identifier unrelated to the individual identifiers. Also, corresponding devices are addressed.

The invention claimed is:

1. A method, comprising:
    assigning, at a transmission point, an individual identifier of the transmission point to common reference signals on common channels of the transmission point, wherein the transmission point is one of two or more transmission points of a communication network, and the two or more transmission points being configured for cooperative transmission as part of a cooperation area to the at least one target device;
    dynamically allocating, to dedicated reference signals on dedicated channels of the transmission point, an identifier unrelated to and different from the individual identifier, wherein the dedicated reference signals are demodulation reference signals to be generated by at least one target device using a function applied to information determined using the identifier;
    transmitting, by the transmission point and using the individual identifier, the common reference signals on the common channels to the at least one target device;
    transmitting by the transmission point an indication of the identifier to the at least one target device and to other transmission points of the two or more transmission points in the cooperation area, the identifier to be used by the at least one target device to generate the dedicated reference signals and to be used by the transmission points in the cooperation area to share the identifier for the cooperative transmission; and
    receiving, by the transmission point and using the identifier, the dedicated reference signals on the dedicated channels from the at least one target device, the demodulation reference signals known by the transmission point to be generated by the at least one target device using the function applied to the information determined using the identifier.

2. A method according to claim 1, wherein said assigning comprises
    assigning a physical identifier of the transmission point as the individual identifier.

3. A method according to claim 1, wherein said allocating comprises
    allocating a high-layer identifier associated to the network area constituted by the two or more transmission points in the cooperation area as a common identifier.

4. A method according to claim 1, wherein said allocating comprises
    maintaining a predefined indexed list of useable identifiers, and
    selecting, at the transmission point, an indexed identifier from the indexed list based on an indicated index received from a network entity or another transmission point in the cooperation area.

5. A method according to claim 1, wherein said allocating comprises
    predefining an identifier shift parameter, and
    shifting the identifier of the transmission point by the value indicated by the at least one common shift parameter.

6. A method according to claim 1, wherein said allocating comprises
    grouping individual identifiers of respective transmission points in the cooperation area to a group cell identifier, and
    changing, at the transmission point, the group cell identifier based on a scrambling identifier by the scrambling value thereof.

7. A method according to claim 1, wherein said allocating comprises
    maintaining a predefined indexed list of useable identifiers, and
    selecting, at the transmission point, an indexed identifier from the indexed list based on an indicated index received from another transmission point in the cooperation area.

8. A method according to claim 1, wherein said allocating comprises
    predefining an identifier shift parameter, and
    shifting the identifier of another transmission point in the cooperation area by the value indicated by the at least one common shift parameter.

9. A method according to claim 1, further comprising
    transmitting the information for allocating the identifier allocated to the dedicated reference signals, from the transmission point to the at least one target device.

10. A method, comprising:
    receiving at a target device information suitable for allocating, to dedicated reference signals on dedicated channels of two or more transmission points of a communication network, an identifier unrelated to and different from individual identifiers of the two or more transmission points, each transmission point being-identified by an individual identifier used for common reference signals on common channels;

wherein the two or more transmission points are configured for cooperative transmission as part of a cooperation area to the target device;

receiving, at the target device and using the individual identifier, the common reference signals on the common channels;

generating by the target device the dedicated reference signals, wherein the dedicated reference signals are demodulation reference signals, and wherein the generating uses a function applied to information determined using the identifier; and transmitting, by the target device, the generated dedicated reference signals on the dedicated channels to at least one transmission point in the cooperation area.

11. A device, comprising:

a processor configured to assign at a transmission point an individual identifier of the transmission point to common reference signals on common channels of the transmission point, wherein the transmission point is one of two or more transmission points of a communication network, and the two or more transmission points being configured for cooperative transmission as part of a cooperation area to the at least one target device, wherein the processor is configured to dynamically allocate, to dedicated reference signals on dedicated channels of the transmission point, an identifier unrelated to and different from the individual identifier, wherein the dedicated reference signals are demodulation reference signals to be generated by at least one target device using a function applied to information determined using the identifier;

a transmitter configured to transmit by the transmission point the common reference signals on the common channels to the at least one target device, and to transmit by the transmission point an indication of the identifier to the at least one target device and to other transmission points of the two or more transmission points in the cooperation area, the identifier to be used by the at least one target device to generate the dedicated reference signals and to be used by the transmission points in the cooperation area to share the identifier for the cooperative transmission; and a receiver configured to receive by the transmission point the dedicated reference signals on the dedicated channels to at least one target device, the demodulation reference signals known by the transmission point to be generated by the at least one target device using the function applied to the information determined using the identifier.

12. A device, comprising:

a receiver configured receive at a target device information suitable for allocating, to dedicated reference signals on dedicated channels of two or more transmission points of a communication network, an identifier unrelated to and different from individual identifiers of the two or more transmission points, each transmission point being identified by an individual identifier used for common reference signals on common channels;

wherein the two or more transmission points as part of a cooperation area are configured for cooperative transmission to the target device;

the receiver configured to receive, at the target device and using the individual identifier, the common reference signals on the common channels;

a processor configured to generate by the target device the dedicated reference signals, wherein the dedicated reference signals are demodulation reference signals, and wherein the generating uses a function applied to information determined using the identifier; and a transmitter configured to transmit, by the target device, the generated dedicated reference signals on the dedicated channels to at least one transmission point in the cooperation area.

13. A method according to claim 1, wherein the communication network is an evolved universal terrestrial access network, and the common channels of the transmission point comprise one or more of:
a physical downlink control channel,
a primary synchronization channel,
a secondary synchronization channel,
a cell specific reference signal based broadcast channel,
a physical control format indicator channel,
a physical hybrid ARQ indicator channel.

14. A method according to claim 1, wherein said allocating comprises
maintaining a predefined indexed list of usable identifiers; and
wherein the information indicative of the identifier comprises an index of the indexed list of usable identifiers.

15. A method according to claim 10,
wherein the communication network is an evolved universal terrestrial access network, and the common channels of at least one of the one or more transmission points comprise one or more of:
a physical downlink control channel,
a primary synchronization channel,
a secondary synchronization channel,
a cell specific reference signal based broadcast channel,
a physical control format indicator channel,
a physical hybrid ARQ indicator channel.

16. A method according to claim 10,
wherein said receiving comprises maintaining a predefined indexed list of usable identifiers; and
wherein said information suitable for allocating comprises an indication of an index of the indexed list of usable identifiers.

17. A method according to claim 10,
wherein said information suitable for allocating is received in downlink control information on a physical downlink control channel of an evolved universal terrestrial radio access network.

18. A method according to claim 10, wherein the dedicated reference signals are demodulation reference signals generated using the DMRS_ID from one of the following:
1) DMRS_ID=$f$(CELL(n)_ID+Scramble_ID), where CELL($\cdot$)_ID is a pre-configured cell identification (ID) list, n and Scramble_ID are known from signaling, and CELL(n)_ID is the identifier, and $f(\cdot)$ is a known function that is the function applied to the information determined using the identifier;
2) DMRS_ID=$f$(CELL_ID+shift_value+Scramble_ID), where CELL_ID is an identification of a cell to which the target device is camping on, the shift_value and n and Scramble_ID are known from signaling and is 0 or 1, and shift_value is the identifier; or
3) DMRS_ID=$f$(CELL_ID%N+Scramble_ID), where CELL_ID % N is a grouped DMRS_ID, Scramble_ID is known from signaling and has a value of 0, ..., N−1, and Scramble_ID is the identifier.

19. A method according to claim 1, wherein the dedicated reference signals are demodulation reference signals generated using the DMRS_ID from one of the following:
1) DMRS_ID $f$(CELL(n)_ID+Scramble_ID), where CELL(•)_ID is a pre-configured cell identification (ID) list, n and Scramble_ID are known from signaling, and CELL(n)_ID is the identifier, and $f(•)$ is a known function that is the function applied to the information determined using the identifier;
2) DMRS_ID=$f$(CELL_ID+shift_value+Scramble_ID), where CELL_ID is an identification of a cell to which the target device is camping on, the shift_value and n and Scramble_ID are known from signaling and is 0 or 1, and shift_value is the identifier; or
3) DMRS_ID=$f$(CELL_ID%N+Scramble_ID), where CELL_ID%N is a grouped DMRS_ID, Scramble_ID is known from signaling and has a value of 0, . . . , N−1, and Scramble_ID is the identifier.

* * * * *